United States Patent [19]

Hodges et al.

[11] Patent Number: 4,970,633
[45] Date of Patent: Nov. 13, 1990

[54] SIGNAL LAMP CONSTRUCTION UTILIZING INSERTS

[75] Inventors: Joseph T. Hodges, Leawood, Kans.; Russell L. White, Raymore, Mo.

[73] Assignee: Peterson Manufacturing Company, Grandview, Mo.

[21] Appl. No.: 318,702

[22] Filed: Mar. 2, 1989

[51] Int. Cl.⁵ ................................................ B60Q 1/26
[52] U.S. Cl. ..................................... 362/326; 362/61; 362/367
[58] Field of Search ...................... 362/61, 80, 83, 363, 362/367, 255, 362, 326, 268

[56] References Cited

U.S. PATENT DOCUMENTS

| | | | |
|---|---|---|---|
| 1,389,799 | 9/1921 | Vansickle | 362/367 |
| 1,471,554 | 10/1923 | Gacopetta | 362/367 |
| 1,513,300 | 10/1924 | Vose | 362/367 |
| 1,573,578 | 2/1926 | Rosenbluth | 362/367 |
| 1,769,917 | 7/1930 | Dimand | 362/367 |
| 1,833,160 | 11/1931 | Harrington | 362/367 |
| 2,174,067 | 9/1939 | Bahr . | |
| 3,275,816 | 9/1966 | Brunger . | |
| 3,430,229 | 2/1969 | Ornas, Jr. et al. . | |
| 3,678,266 | 7/1972 | Fradette . | |
| 4,675,792 | 6/1987 | Dorleans . | |

FOREIGN PATENT DOCUMENTS

| | | | |
|---|---|---|---|
| 1430711 | 4/1969 | Fed. Rep. of Germany | 362/367 |
| 731573 | 9/1932 | France | 363/367 |
| 139074 | 2/1920 | United Kingdom | 362/367 |

Primary Examiner—Stephen F. Husar
Assistant Examiner—Richard R. Cole
Attorney, Agent, or Firm—Litman, McMahon & Brown

[57] ABSTRACT

Signal lamp assembly comprising a light source surrounded by transparent lens walls in four horizontal directions is produced by molding the lens walls in two portions and securing them together. Lens patterns can be molded in three directions, but due to molding limitations, the fourth side cannot be easily molded into a lens configuration. In order to provide a lens for the fourth side, a separately made molded lens insert is placed in receiving and retaining grooves prior to the housing portions being secured together. The resultant assembly retains the insert in desired position and lens walls are thereby effectively provided in the four directions.

6 Claims, 1 Drawing Sheet

SIGNAL LAMP CONSTRUCTION UTILIZING INSERTS

BACKGROUND OF THE INVENTION

The present invention relates to signal lamps primarily intended for automotive vehicles, such as trucks, and particularly to such a lamp having a housing with molded lens walls on three sides and the use of a molded insert to provide a lens for the fourth side.

Molded synthetic resin signal lamps with walls formed in lens configuration are commonly used on most types of automotive vehicles and also for stationary purposes, such as road barriers, signs, etc. In many instances, it is highly desirable that the light be modified by lenses in all four horizontal directions. However, this presents difficult molding problems such as providing adequate relief for the mold core when the housing is to be constructed of hollow or bowl shaped portions to be secured together.

OBJECTS OF THE INVENTION

Therefore, the objects of the present invention are: to provide a molded signal lamp construction by which a lens wall is placed about the light source in all four horizontal directions; to provide such an arrangement wherein the lens pattern is integrally molded into the lamp housing walls to produce light modification on three sides, with a separate molded insert providing the lens pattern on the fourth side; to provide such a lens arrangement which is relatively inexpensive to produce but highly effective in use and attractive in appearance; to provide such a signal lamp arrangement wherein the molded portions of the lamp housing are easily assembled with the molded insert lens positioned and contained therein; to provide an improved method of producing a four directional lens lamp housing and to provide a method and construction of such a lamp housing which constitutes a substantial improvement over the prior art.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
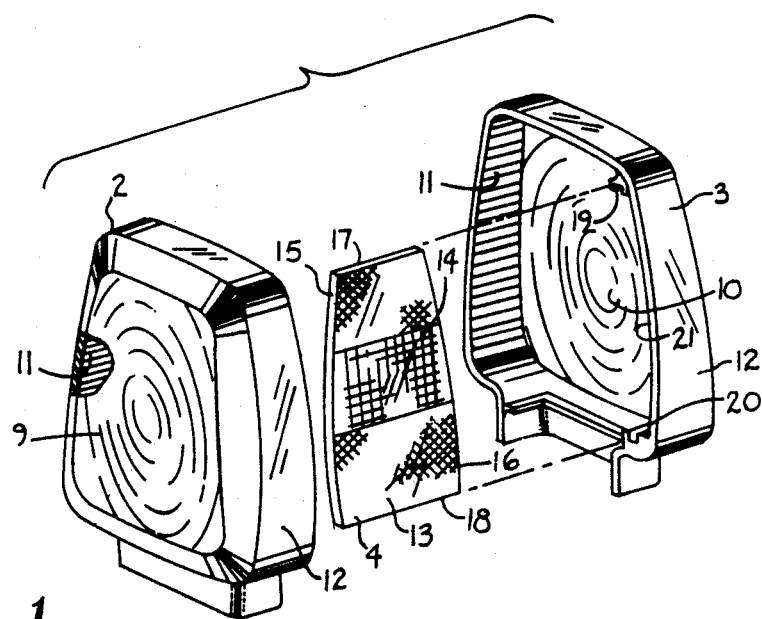
FIG. 1 is an exploded view of the lamp housing showing a front housing portion, a rear housing portion, and an insert ready for insertion into said housing portions.
Figure 2:
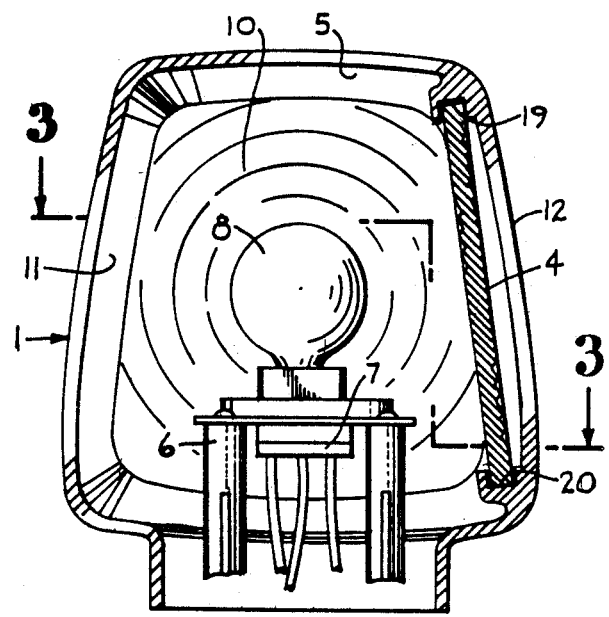
FIG. 2 is a fragmentary, cross-sectional, elevational view showing the insert in place in the rear housing portion.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a lamp housing assembly embodying the present invention. The housing 1 is formed from a molded front housing portion 2, a rear housing portion 3, and a molded lens insert 4. The housing 1 forms a hollow chamber 5 into which is normally inserted a suitable support 6 having secured thereto a bulb socket 7 in which is mounted an appropriate light source, in this example an incandescent bulb 8. Details of the support, socket and bulb are not provided, since they are not material to the present invention and may take several known forms.

The housing portions 2 and 3, in this example, are molded integrally with lens patterns 9 and 10 for controlling the light pattern directed forwardly and rearwardly of the assembled housing and one one side 11 of each housing portion for controlling the light pattern directed to one side, so that the desired light pattern is directed to three sides of the assembled housing 1. The fourth side 12 of each housing portion remains relatively transparent (non-lens), since it is technically difficult and expensive to mold a lens pattern into side 12 while also molding the remaining sides.

To compensate, an insert 4 is provided. The insert 4 is suitably molded with the desired lens pattern 13 and 14 therein. The insert 4 also is formed with side edges 15 and 16 in the general shape and separation of the internal surface curvature of the front and rear housing portions 2 and 3. Also, upper and lower insert edges 17 and 18, in this example, are parallel to each other and spaced apart a predetermined distance for a reason discussed below.

Figure 3:
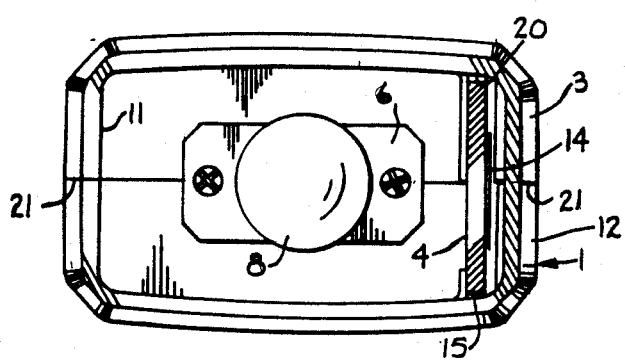
FIG. 3 is a cross-sectional plan view taken on the lines 3—3, FIG. 2, further showing the insert assembled within the housing.

The housing portion 3 has molded thereinto upper and lower grooves 19 and 20 adapted to simultaneously receive said upper and lower insert edges 17 and 18. The grooves 12 and 20 thereby retain the insert in desired position with respect to the bulb 8 when the front and rear housing portions 2 and 3 are suitably joined together at a seam 21, FIG. 3, as by vibration welding or adhesive.

In use, due in part to the insert 4, the desired light pattern is projected through lenses to form desired light patterns in all four horizontal directions. Yet, the arrangement is such that the housing portions are relatively easily and inexpensively molded, as is the lens insert 4.

It is to be understood that while certain forms of the present invention have been illustrated and described herein, it is not to be limited to the specific forms or arrangement of parts described and shown.

What is claimed and desired to be secured by Letters Patent is as follows:

1. In a signal lamp housing assembly having a chamber enclosed on a plurality of upwardly extending sides and containing a light source for emitting light through all of said sides, one of said sides being a light transmittable non-lens side and the other of said sides being light transmittable lens sides:
    (a) a lens insert within said chamber and between said light source and said non-lens side, and (b) means retaining said insert in operable position for altering light transmitted from said light source through said non-lens side.

2. A signal lamp assembly comprising a front housing and a rear housing:
 (a) said housings, when joined, forming a chamber enclosed on four upwardly extending sides, one of said sides being a light transmittable non-lens side and the other of said sides being light transmittable lens sides,
 (b) a light source in said chamber for emitting light through all of said sides,
 (c) spaced apart retainers in said chamber located in a plane between said light source and said non-lens side, and
 (d) a lens insert secured by said retainers within said chamber between said light source and said non-lens side, said lens insert comprising a light modifying lens modifying light from said light source which is directed through said side.

3. The signal lamp assembly of claim 2 wherein:
 (a) said space apart retainers are in the form of upper and lower insert receiving grooves.

4. A signal lamp assembly comprising a bowl shaped front housing and a bowl shaped rear housing, said housings, when joined, forming a chamber enclosed by a plurality of upwardly extending sides,
 (a) a light source in said chamber for emitting light through all of said sides,
 (b) all of said sides except one comprising light modifying lenses, said one side being a light transmittable non-lens side,
 (c) a light modifying lens insert located between said light source and said non-lens side, and
 (d) means forming a retainer in said chamber and retaining said lens insert in said location between said light source and said non-lens side and positioned for modifying light from said light source which passes through said non-lens side.

5. A method of producing an enclosed signal lamp having an internal light source and four upwardly extending sides, three of said sides being light modifying lenses functional in three horizontal directions, the fourth side being a light transmittable non-lens side directed in the fourth direction, comprising:
 (a) molding front and rear hollow lamp portions which are adapted to be secured together to produce a chamber having said four sides;
 (b) said molding step producing integral molded lenses on said three sides but leaving said fourth side a light transmittable non-lens side;
 (c) simultaneously molding retaining means into at least one of said housing portions;
 (d) mounting a lens insert onto said retaining means between said light source and said fourth side; and
 (e) securing said lamp portions together, thereby containing said insert in said chamber on said retaining means,
 (f) whereby light produced by said light source within said chamber passes through a lens in all four directions.

6. The method as set forth in claim 5 wherein said retaining means comprises a pair of spaced apart grooves molded in at least one of said lamp portions.

* * * * *